United States Patent
Budde et al.

(10) Patent No.: US 10,043,027 B1
(45) Date of Patent: Aug. 7, 2018

(54) GENERATION OF MASK-VALUE PAIRS FOR MANAGING ACCESS TO MEMORY SEGMENTS

(71) Applicant: Xilinx, Inc., San Jose, CA (US)

(72) Inventors: Gangadhar Budde, Latur (IN); Pradeep Kumar Mishra, Hyderabad (IN); Somdutt Javre, Seoni (IN)

(73) Assignee: XILINX, INC., San Jose, CA (US)

( * ) Notice: Subject to any disclaimer, the term of this patent is extended or adjusted under 35 U.S.C. 154(b) by 251 days.

(21) Appl. No.: 14/946,607

(22) Filed: Nov. 19, 2015

(51) Int. Cl.
G06F 17/50 (2006.01)
G06F 21/62 (2013.01)
G06F 3/06 (2006.01)

(52) U.S. Cl.
CPC ........ G06F 21/6218 (2013.01); G06F 3/0604 (2013.01); G06F 3/0622 (2013.01); G06F 3/0629 (2013.01); G06F 3/0673 (2013.01)

(58) Field of Classification Search
CPC .. G06F 21/6218; G06F 3/0604; G06F 3/0622; G06F 3/0629; G06F 3/0673; G06F 17/505; G06F 17/5054
See application file for complete search history.

(56) References Cited

U.S. PATENT DOCUMENTS

| | | | | |
|---|---|---|---|---|
| 5,129,083 A * | 7/1992 | Cutler | | G06F 9/4428 |
| 5,136,712 A * | 8/1992 | Perazzoli, Jr. | | G06F 9/465 |
| | | | | 718/104 |
| 5,187,790 A * | 2/1993 | East | | G06F 9/468 |
| | | | | 718/107 |
| 5,694,490 A * | 12/1997 | Howell | | G06T 7/0012 |
| | | | | 382/128 |
| 7,512,787 B1 * | 3/2009 | Viswanath | | H04L 63/08 |
| | | | | 713/160 |
| 9,703,516 B2 * | 7/2017 | Hofstee | | G06F 3/1423 |
| 2010/0011037 A1 * | 1/2010 | Kazar | | G06F 3/0605 |
| | | | | 707/E17.01 |

OTHER PUBLICATIONS

U.S. Appl. No. 14/746,646, filed Jun. 22, 2015, Mishra, Pradeep Kumar et al., San Jose, CA USA.

* cited by examiner

*Primary Examiner* — Hadi S Armouche
*Assistant Examiner* — Shu C Gao
(74) *Attorney, Agent, or Firm* — LeRoy D. Maunu

(57) ABSTRACT

Methods and systems are disclosed for determining mask-value pairs for controlling access to a memory segment for a plurality of IDs. A first set of mask-value pairs is determined for a set of allowed identifiers (IDs) and a set of non-allowed IDs. Each mask-value pair of the first set matches at least one ID of the set of allowed IDs and does not match any of the IDs of the set of non-allowed IDs. Redundant mask-value pairs are removed from the first set to produce a second set. Subsets of mask-value pairs in the second set that match the entire set of allowed IDs are determined. The subset having the highest processing efficiency is determined and selected. A set of configuration data is generated that is configured to cause a memory management circuit to enforce access to the memory segment based on the selected subset of mask-value pairs.

20 Claims, 11 Drawing Sheets

GENERATION OF MASK-VALUE PAIRS FOR MANAGING ACCESS TO MEMORY SEGMENTS

TECHNICAL FIELD

The disclosure generally relates to programmable integrated circuits (IC).

BACKGROUND

Programmable ICs are devices that can be programmed to perform specified logic functions. One type of programmable IC, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a circuit design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include one or more embedded processors that are capable of executing program code. A processor can be fabricated as part of the same die that includes the programmable logic circuitry and the programmable interconnect circuitry, which may also be referred to collectively as the "programmable circuitry" of the IC. It should be appreciated that execution of program code within a processor is distinguishable from "programming" or "configuring" the programmable circuitry that may be available on an IC. The act of programming or configuring the programmable circuitry of an IC results in the implementation of different physical circuitry as specified by the configuration data within the programmable circuitry.

SUMMARY

Various example implementations are directed to methods for determining mask-value pairs for protecting a memory segment against unauthorized access. In an example implementation, a first set of mask-value pairs is determined for a set of allowed master identifiers (IDs) that are to be allowed access to the memory segment and a set of non-allowed IDs that are to be denied access to the memory segment. Each mask-value pair of the first set matches at least one master ID of the set of allowed IDs and does not match any of the IDs of the set of non-allowed IDs. Redundant mask-value pairs are removed from the first set to produce a second set of mask-value pairs. Subsets of mask-value pairs in the second set that match the entire set of allowed IDs are determined. The subset having the highest processing efficiency is determined and selected. A set of configuration data is generated that is configured to cause a memory management circuit to enforce access to the memory segment based on the selected subset of mask-value pairs.

A system is also disclosed for determining mask-value pairs for protecting a memory segment against unauthorized access. The system includes a processor and a memory coupled to the processor. The memory includes a set of instructions that when executed by the processor cause the processor to determine a first set of mask-value pairs for a set of allowed IDs and a set of non-allowed IDs. Each mask-value pair of the first set matches at least one master ID of the set of allowed IDs and does not match any of the IDs of the set of non-allowed IDs. The instructions also further cause the processor to remove redundant mask-value pairs from the first set to produce a second set of mask-value pairs. The processor also determines subsets of mask-value pairs in the second set that match the entire set of allowed IDs. The subset having the highest processing efficiency is determined and selected. The processor generates a set of configuration data that is configured to cause a memory management circuit to restrict access to the memory segment based on the selected subset of mask-value pairs.

BRIEF DESCRIPTION OF THE DRAWINGS

Various aspects and features of the disclosed circuits and methods will become apparent upon review of the following detailed description and upon reference to the drawings in which.

DETAILED DESCRIPTION

Figure 1:
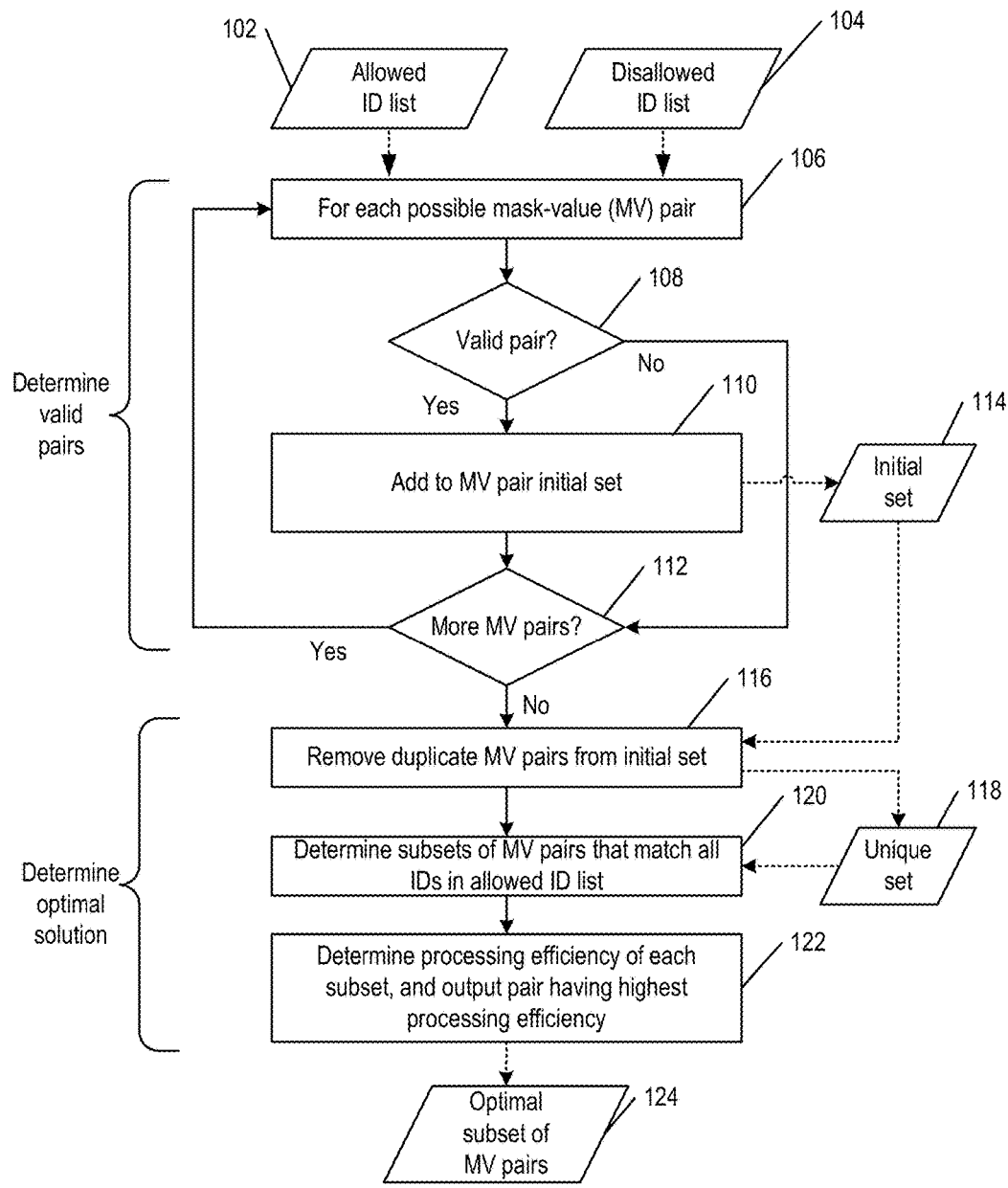
FIG. 1 shows an example process for determining mask-value pairs, in accordance with one or more implementations.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein.

Some systems (e.g., computing devices and/or programmable ICs) include a memory circuit that may be used by logic circuits of multiple subsystems for data storage or for communicating data between the logic circuits. However, conflicts may occur when multiple logic circuits access a shared memory. For example, data written to the memory by one logic circuit or processor may be mistakenly overwritten by another logic circuit or processor before the data can be read by the intended recipient. In some approaches, individual circuits or subsystems may be manually configured by a designer to only access designated portions of a shared memory. However, as the number of circuits or subsystems in a system that access a shared memory increases, it becomes increasingly difficult for a designer to manually design and/or configure circuits to avoid memory conflict. Furthermore, malicious software may cause a processor or other logic circuit to violate memory access permissions intended by a designer.

Some approaches for controlling access to memory circuits use mask-value pairs to indicate IDs of master circuits that are to be allowed access to a particular memory segment. For ease of reference the ID value for a master circuit may be referred to as a "master ID." Each mask-value pair includes a value and a mask that indicates one or more bits of the value as don't care bits. After masking the value of a mask-value pair, the result may match multiple master IDs. As an illustrative example, a 4-bit mask-value pair may include the binary value '1010' and a mask 'XOOX'. X's in the mask indicate don't care bits, and corresponding bits of the value of the pair are masked, and O's in the mask indicate bits of interest. Masking of the value '1010' with the mask 'XOOX' produces the result 'X01X'. This result matches the master IDs '0010', '0011', '1010', and '1011', as the bits of interest in the master IDs match the result 'X01X'. In some implementations, a mask-value pair may be stored as a separate mask '1010' and value 'XOOX'. In some other implementations, a mask-value pair may be stored as a single value 'X01X'.

To control access to a memory segment, one or more mask-value pairs may be selected to match master IDs that are to be allowed access but do not match any of a second set of master IDs that are to be denied access. In some instances, it may not be possible to match all of the master IDs that are to be allowed access using a single mask-value pair. In such instances, multiple mask-value pairs that match different ones of the allowed master IDs may be used to control access to a memory segment. For ease of reference, a set of mask-value pairs that matches all allowed IDs for a memory segment without matching any non-allowed master ID for the memory segment may be referred to as a complete solution. If a complete solution includes multiple mask-value pairs, each of the multiple mask-value pairs may need to be examined by a memory management circuit each time a master circuit attempts to access the memory segment to determine if access should be permitted. To minimize processing resources (circuitry area and/or time) needed to determine whether or not access to the memory segment should be permitted, a complete solution having the smallest number of mask-value pairs should be used to control access to the memory segment. However, determining a smallest set of mask-value pairs that provides a complete solution for a memory segment is a computationally intensive process.

Methods and systems are disclosed for efficiently determining mask-value pairs that provide an optimal complete solution for a set of allowed master IDs and a set of non-allowed master IDs. A first set of mask-value pairs is determined. Each mask-value pair of the first set matches at least one master ID of the set of allowed master IDs and does not match any of the master IDs of the set of non-allowed master IDs. Redundant mask-value pairs are removed from the first set to produce a second set of mask-value pairs. Subsets of mask-value pairs in the second set that provide complete solutions matching the entire set of allowed master IDs are determined. The subset having the highest processing efficiency is determined and selected. A set of configuration data is generated, and the set of configuration data includes data that would cause a memory management circuit to enforce access to the memory segment based on the selected subset of mask-value pairs.

Removing redundant mask-value pairs from the first set reduces the possible combinations of mask-value pairs that need to be evaluated to identify complete solutions and determine which complete solution is optimal. Accordingly, fewer processing resources (e.g., processor cores and/or processing time) are required to determine the optimal complete solution having the fewest mask-value pairs for controlling access to a memory segment. Turning now to the figures, FIG. 1 shows an example process for computing mask-value pairs for restricting access to a memory segment. The process generally determines a set of mask-value pairs that would identify a group of master IDs based on an input first list 102 of master IDs to be allowed access and an input second list 104 of master IDs that are not allowed access. The first and second lists may be specified, for example, by a user as part of a circuit design. Each possible mask-value pair is examined in a process loop starting at block 106 and ending at decision block 112. If a mask-value pair is valid, decision block 108 directs the process to block 110. A mask-value pair is considered valid if it matches at least one master ID in the allowed master ID list 102 and does not match any of the master IDs in the disallowed master ID list 104. At block 110, the process adds the mask-value pair to an initial set of mask-value pairs 114. If the mask-value pair is not valid, decision block 108 directs the process loop to bypass block 110.

After the process loop has been performed for each possible mask-value pair, decision block 112 directs the process to block 116. At block 116, redundant mask-value pairs are removed from the initial set to produce a set of unique mask-value pairs 118. A mask-value pair is redundant if all allowed IDs matched by the mask-value pair are also matched by a second mask-value pair in the initial set. The redundant mask-value pair is removed from the initial set, and the second mask-value pair is retained in the initial set. As previously described, removing redundant mask-value pairs from the first set reduces the possible combinations of mask-value pairs that need to be evaluated to identify complete solutions and determine which complete solution is optimal. Simulated tests for some example circuit designs have shown that removal of mask-value pairs may reduce the size of the initial set 114 by approximately 90 percent.

At block 120, subsets of the unique mask-value pairs that provide a complete solution are determined. A subset provides a complete solution if each master ID in the allowed list 102 matches at least one respective mask-value pair in the subset. At block 122, processing efficiency is determined for each of the subsets. Processing efficiency may be determined, for example, based on the number of mask-value pairs included in the subset. As each mask-value pair in a subset may need to be examined to determine whether or not a master ID should be allowed access to a memory segment, a larger number of mask-value pairs included in a subset decreases processing efficiency during runtime. The subset 124 having the highest level of processing efficiency (i.e., the lowest number of mask-value pairs) is selected and stored.

Figure 2:
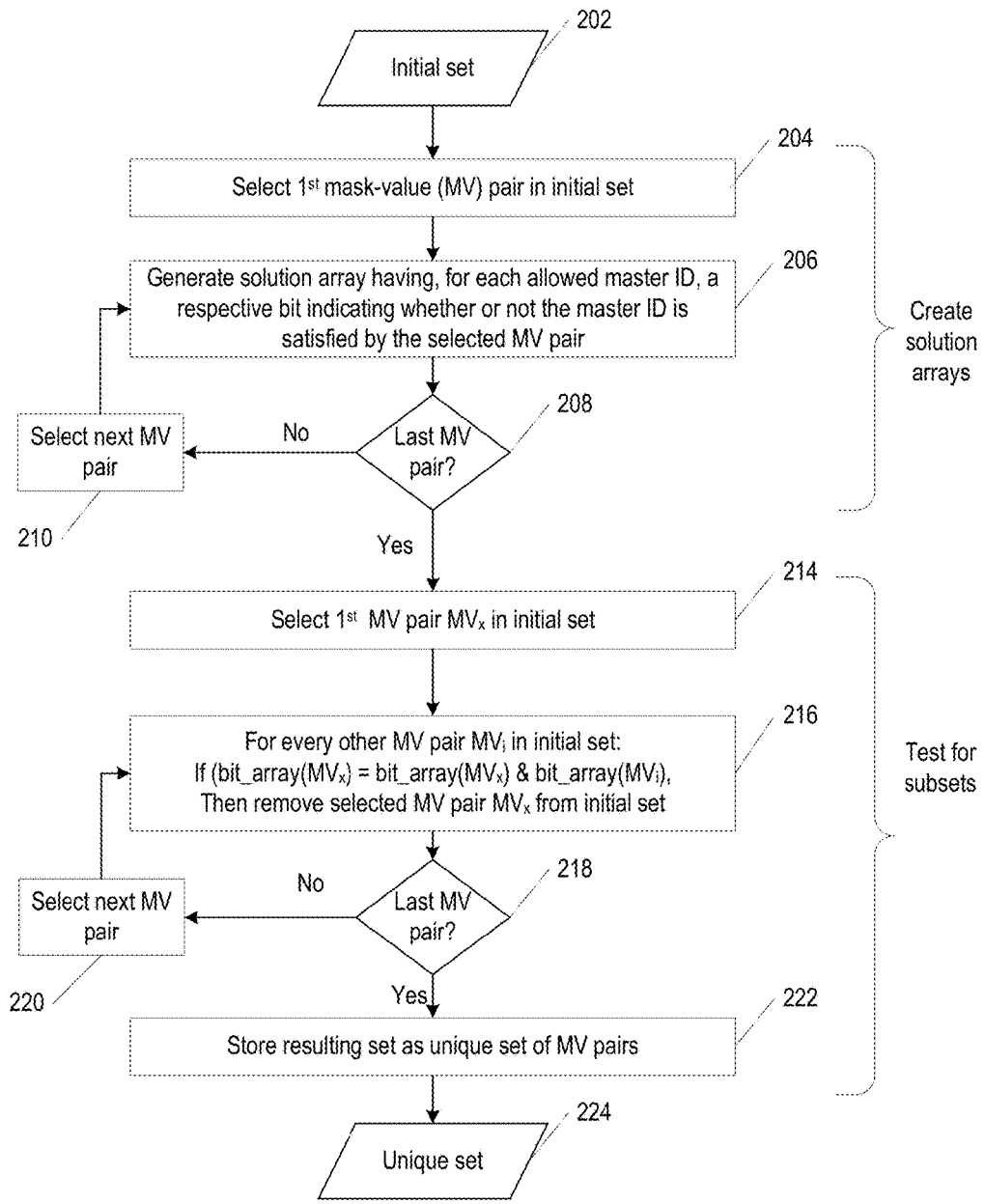
FIG. 2 shows an example process for determining unique mask-value pairs, in accordance with one or more implementations.

FIG. 2 shows an example process for determining unique mask-value pairs from an initial set 202 of mask-value pairs. The process may be used, for example, for removing redundant mask-value pairs at block 116 in FIG. 1. A respective solution array is generated for each mask-value pair of the initial set in a first process loop starting at block 204 and ending at decision block 208. Each solution array includes a respective bit for each master ID in the allowed list. The bit is set to a first value (e.g., logic 1) if the mask-value pair matches the master ID corresponding to the bit and is set to a second value (e.g., logic 0) if the mask-value pair does not match the ID. As an illustrative example, for a 4-bit master ID (having 16 possible values) the solution array for each mask-value pair may include 16 bits (one for each of the 16 possible master ID values). At block 204, a first mask-value pair in the initial set 202 is selected. At block 206, a solution array is generated for the selected mask-value pair. If the selected mask-value pair is not the last mask-value pair in the initial set 202, decision block 208 directs the process to select the next mask-value pair in the initial set 202 at block 210 and the process returns to block 206. The process loops in this manner until the selected mask-value pair is the last in the initial set when the process reaches decision block 208.

Generation of solution arrays allows redundant mask-value pairs to be identified using an efficient bitwise comparison between mask-value pair. At block 214, a first mask-value pair, $MV_x$, is selected from the initial set of mask-value pairs. At block 216, the selected mask-value pair $MV_x$ is tested to determine whether or not it is redundant to other mask-value pairs in the initial set. For every other mask-value pair $MV_i$, in the initial set, a bitwise AND of $MV_i$, and $MV_x$ is calculated. If the result of the bitwise AND is equal to the select mask-value pair $MV_x$, the allowed IDs matched by $MV_x$ are a subset of the allowed IDs matched by $MV_i$, and $MV_x$ is redundant. If $MV_x$ is redundant, $MV_x$ is removed from the initial set of mask-value pairs at block 216. If the selected mask-value pair is not the last mask-value pair in the set, decision block 218 directs the process to select the next mask-value pair in the initial set 202 at block 220 and the process returns to block 216. The process loops in this manner until the selected mask-value pair is the last in the initial set when the process reaches decision block 208. At block 222, the mask-value pairs remaining in the initial list are stored as a set of unique mask-value pairs 224.

Figure 3:
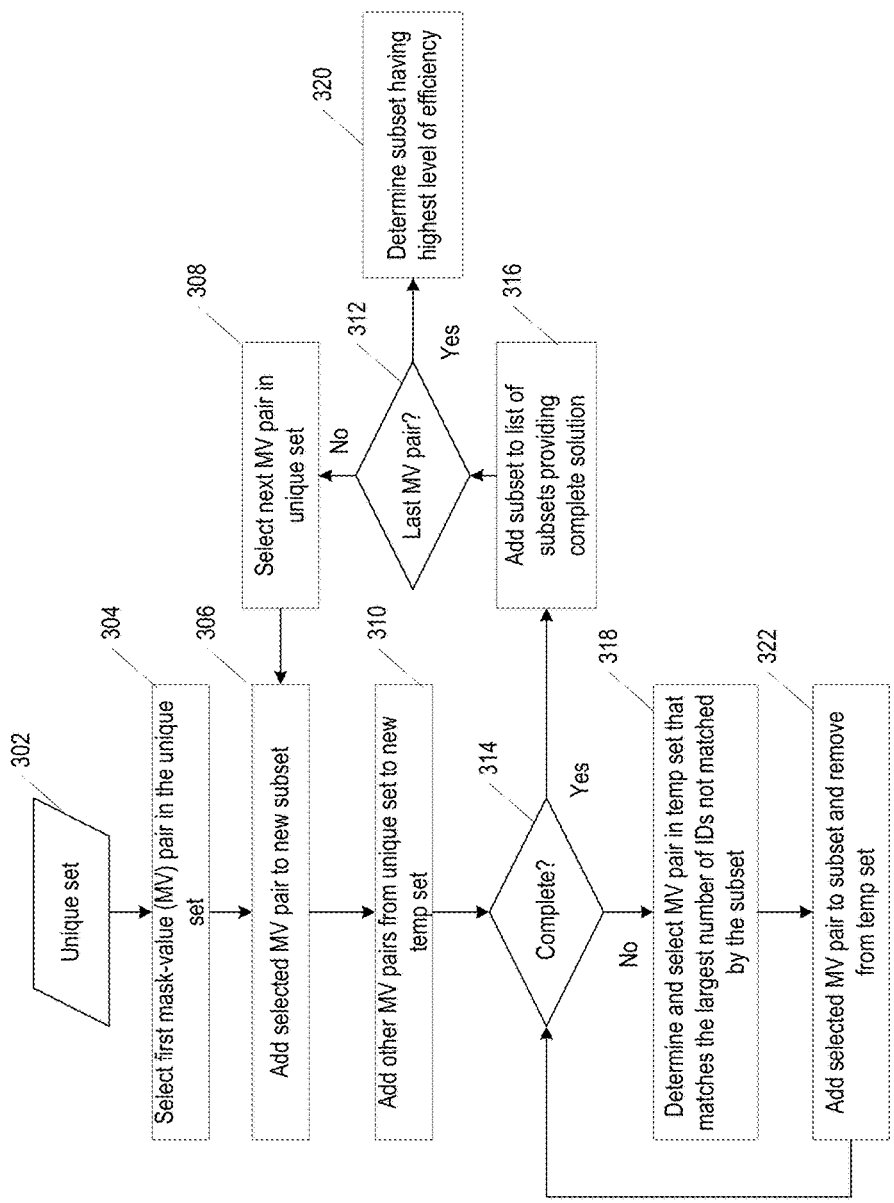
FIG. 3 shows an example process for determining subsets of mask-value pairs that provide a complete solution, in accordance with one or more implementations.

FIG. 3 shows an example process for determining subsets of mask-value pairs that provide a complete solution for matching all IDs in an allowed master ID list. At block 304, a first-mask value pair is selected from a set of unique mask-value pairs 302. At block 306, the selected mask-value pair is added to a respective subset. At block 310, other mask-value pairs from the set of unique mask-value pairs 302 are added to a temporary set at block 310. While the mask-value pairs in the respective subset including the selected mask-value pair do not provide a complete solution, decision block 314 directs the process to block 318. At block 318, the process determines and selects a mask-value pair in the temporary set that matches the largest number of IDs from the allowed master ID list that are not currently matched by the respective subset. For instance, the process may first identify a list of master IDs from the allowed master ID list that are not currently matched by the respective subset. Each mask-value pair in the temporary set may be evaluated to determine a number of master IDs in the list that are matched by the mask-value pair. At block 322, the selected mask-value pair is added to the subset and removed from the temporary list. If the mask-value pairs in the subset provide a complete solution, decision block 314 directs the process to add the subset to a list of complete solutions at block 316. If the selected mask-value pair is not the last in the set of unique mask-value pairs, decision block 312 directs the process to select the next mask-value pair at block 308 and return to block 306.

The process repeats in this manner until the last mask-value pair in the set of unique mask-value pairs 302 is selected when the process reaches decision block 312. If the last mask-value pair in the set of unique mask-value pairs 302 is selected, decision block 312 directs the process to block 320, where the subset that is most efficient is determined. As previously described, the most efficient subset may be identified by determining the subset in the list of complete solutions that includes the fewest number of mask-value pairs.

In some implementations, a process may be configured to automatically determine optimal complete solutions for a plurality of memory segments defined by a user. For each defined memory segment, the process generates a respective access control entry for controlling access to the memory segment by a memory management circuit. The access control entry may include, for example, a memory address range corresponding to the memory segment and mask-value pairs included in the optimal complete solution determined for the memory segment. In some implementations, multiple access control entries may be used to specify respective groups of master IDs having different types of access to the same memory segment. For example, master IDs 0100 and 0101 may have read/write access and master IDs 0111 and 0110 may have read-only access. In some other implementations, an access control entry may include respective sets of mask-value pairs for different types of access to the same memory segment. For instance, a first set of mask-value pairs may provide a complete solution identifying master IDs to be allowed read access. A second set of mask-value pairs may provide a complete solution identifying master IDs to be allowed write access. For ease of explanation, the following examples are primarily described with reference to access control entries having one set of mask-value pairs forming a complete solution for a single type of access (e.g., read/write access) to a respective memory segment.

Figure 4:
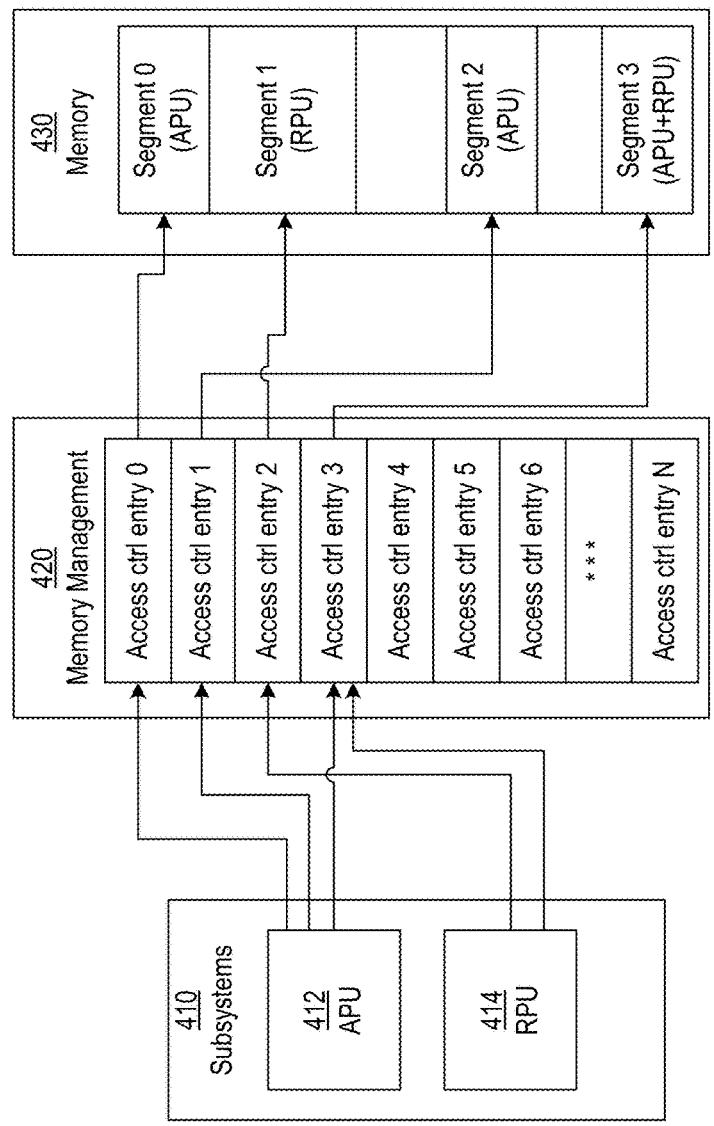
FIG. 4 shows an example circuit for controlling access to a memory segment, in accordance with one or more implementations.

FIG. 4 shows an example system configured in accordance with one or more implementations. The system includes a plurality of defined subsystems 410, a memory 430, and a memory management circuit 420 configured to control access to defined segments of the memory 430 by the subsystems. In this example, the defined subsystems include an application processing unit subsystem 412 and a real-time processing unit subsystem 414. Each subsystem includes one or more defined master circuits (not shown in FIG. 4) configured to initiate data transactions with memory 430. The defined segments of the memory 430 include four segments (segments 0-3).

The memory management circuit 420 restricts access to each of the defined memory segments, by master circuits in the subsystems 412 and 414, based on a respective access control entry for the memory segment (access control entries 1-N). In an example implementation, each access control entry used by the memory management circuit 420 specifies a range of memory addresses of a memory segment in the memory 430. The access control entry also specifies a mask-value pair indicative of IDs of circuits to be permitted access to the memory segment. In this example, access control entry 0 restricts access to segment 0 of memory 430 to application processing unit (APU) subsystem 412. Access control entry 1 restricts access to segment 2 of memory 430 to APU subsystem 412. Access control entry 2 restricts access to segment 1 of memory 430 to real-time processing unit (RPU) subsystem 414. Access control entry 3 restricts access to segment 3 of memory 430 to APU subsystem 412 and to RPU subsystem 414.

Figure 5:
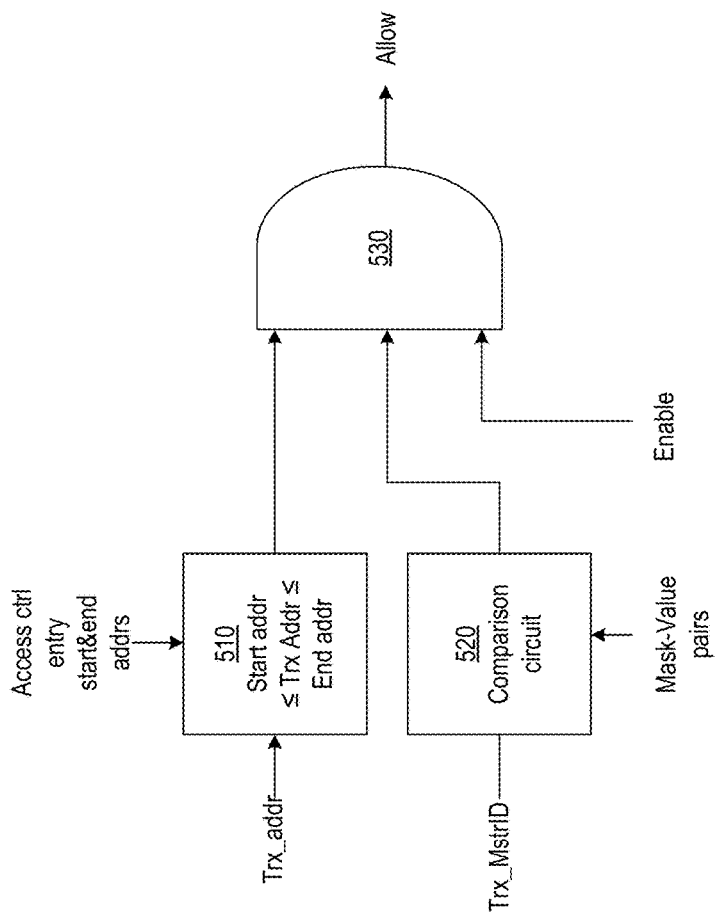
FIG. 5 shows an example device, configured in accordance with one or more implementations.

The memory management circuit may use various processes and/or circuit arrangements to restrict access for each defined memory segment. FIG. 5 shows an example circuit 500 for controlling access to a defined memory segment according to an access control entry. The memory management circuit 420 in FIG. 4, may use a respective instance of the circuit 500 for each access control entry specified for a memory segment. The number of access entries is equal to the number of mask-value pairs in the complete solutions. The circuit 500 includes a first comparison circuit 510 that is configured to compare a destination address (Trx_addr) indicated in a data transaction to start and end addresses of a memory segment specified in the corresponding access control entry. In this example, the comparison circuit 510 outputs a logical 1 if the Trx_addr falls within the start and end addresses specified in the access control entry. Otherwise, the comparison circuit 510 outputs a logical 0. The circuit 500 also includes a second comparison circuit 520 configured to determine if the mask-value pair included in the access control entry matches a master ID (Trx_MstrID) indicated by a transaction request. A mask of the mask value pair is applied to Trx_MstrID to produce a masked result. The mask is also applied to the value of the mask-value pair to produce a masked value. If for any of the mask-value pairs, the masked result is equal to the masked value, the comparison circuit 520 outputs a logical 1. Otherwise, the comparison circuit 520 outputs a logical 0.

A logical AND gate 530, receives output signals of the first and second comparison circuits 510 and 520 as first and second input signals. In some implementations, logical AND gate 530 may optionally also receive an enable signal for enabling/disabling access to the memory segment. The enable signal may be useful, for example, to facilitate powering down an idle subsystem. In this example, the enable signal is set to a logical 1 when access to the memory segment is to be enabled and is set to a logical 0 when access is to be disabled. The logical AND gate 530 outputs a signal indicating whether or not the requested transaction should be allowed. In this example, the logical AND gate 530 outputs a logical 1, indicating the transaction should be allowed, if the outputs of comparison circuits 510 and 520 and the enable signal are all set to logical 1's. Otherwise, the logical AND gate 530 outputs a logical 0, indicating the transaction should not be allowed.

Circuits and methods are also disclosed for partitioning a shared memory between two or more subsystems of a circuit design. In some implementations, a software-based design tool includes a user interface for a user to define subsystems, memory segments, circuits that may initiate data transactions with the memory segments, and permissions for accessing the memory segments by the master circuits. For ease of reference, the defined circuits that may initiate data transactions that reference the memory segment may be referred to as master circuits. Data transactions may include, for example, a request to read data from a memory address or a request to write data to a memory address. Each defined memory segment specifies a respective address range of a memory. The defined permissions include information that indicates which ones of the defined master circuits may access each memory segment. The defined permissions may also indicate the type of access the master circuits should have to the memory segments. The specified type of access may include, for example, read/write access, read only access, and/or no access. In some implementations, master circuits may be classified as secure or non-secure. The defined permissions may additionally or alternatively specify assess to secure and non-secure masters in the system. The design tool is configured to automatically generate and/or configure circuits to restrict access to user-defined memory segments according to the user-defined permissions.

In some implementations, the design tool may automatically generate configuration data to configure a memory management circuit to restrict access to one or more memory segments according to the user-defined permissions. Additionally or alternatively, the design tool may automatically supplement a circuit design to include one or more circuits configured to restrict access to one or more memory segments according to the user-defined permissions. For ease of explanation, examples may be primarily described with reference to a design tool that automatically generates configuration data that causes a memory management circuit of a programmable IC to restrict access to memory segments according to the user-defined permissions. Such examples may be adapted to instead automatically generate configuration data to cause programmable resources to implement the memory management circuit.

Figure 6:
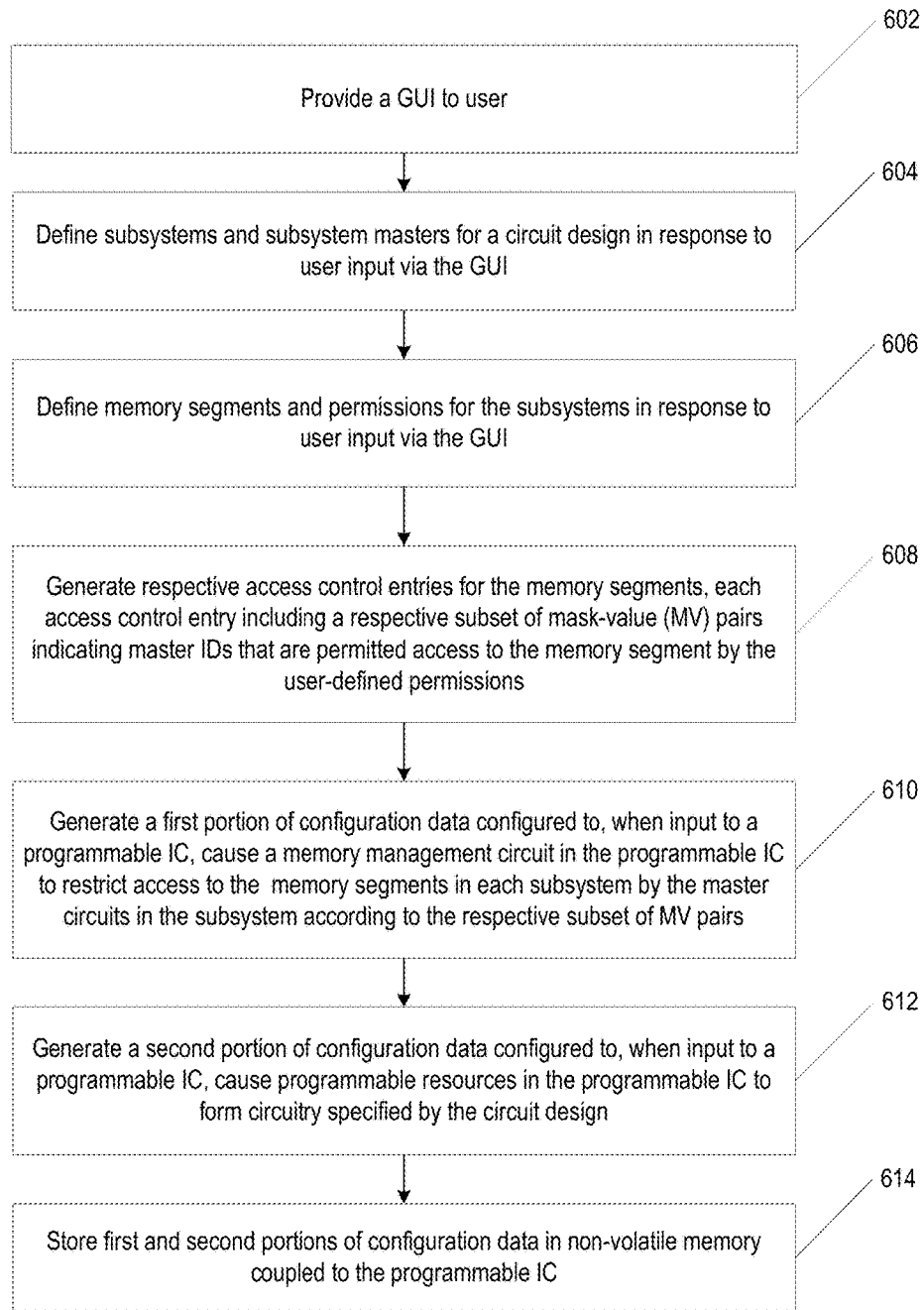
FIG. 6 shows an example process for partitioning memory for a circuit design in a programmable IC.

FIG. 6 shows an example process for partitioning memory for a circuit design in a programmable IC. Using a circuit design tool, a graphical user interface (GUI) is provided to a user at block 602. The GUI includes a user interface for a user to define subsystems of the circuit design, memory segments of a memory of the programmable IC, master circuits in the subsystem, and permissions for accessing the memory segments by the master circuits. At block 604, subsystems and subsystem master circuits are defined for the circuit design in response to user input via the GUI. In some implementations, a subsystem and master circuits of the subsystem may be defined by selecting existing circuits of the circuit design from a graphical circuit design layout, for example. Alternatively or additionally, a user may define subsystems or master circuits by selecting template subsystems and/or master circuits to be added to a circuit design from a library of pre-defined subsystems and/or circuits. At block 606, memory segments and access permissions are defined for the subsystems in response to user input via the GUI. Memory segments may be defined, for example, by specifying address ranges of one or more user-selected memories included in a target programmable IC architecture. An example GUI is discussed in more detail with reference to FIG. 9.

At block 608, respective access control entries are generated for the memory segments. Each access control entry includes a respective subset of mask-value pairs indicating master IDs that are permitted access to the memory segment by the user-defined permissions. At block 610, a first portion of configuration data is generated. The first portion of configuration data is configured to, when input to a programmable IC, cause a memory management circuit in the programmable IC to restrict access to the memory segments in each subsystem by the master circuits according to the access control entries. Example processes for generating the first portion of configuration data are discussed with reference to FIG. 7. At block 612, a second portion of configuration data is generated. The second portion of configuration data is configured to, when input to a programmable IC, cause programmable resources in the programmable IC to implement circuitry specified by the circuit design. Generating the second portion of configuration data may include, for example, compilation and synthesis of HDL code, placement and routing of the synthesized circuit design, optimization of the placed and routed design, and generating configuration data to implement the optimized design. At block 614, the first and second portions of configuration data are stored in a non-volatile memory coupled to the programmable IC.

Figure 7:
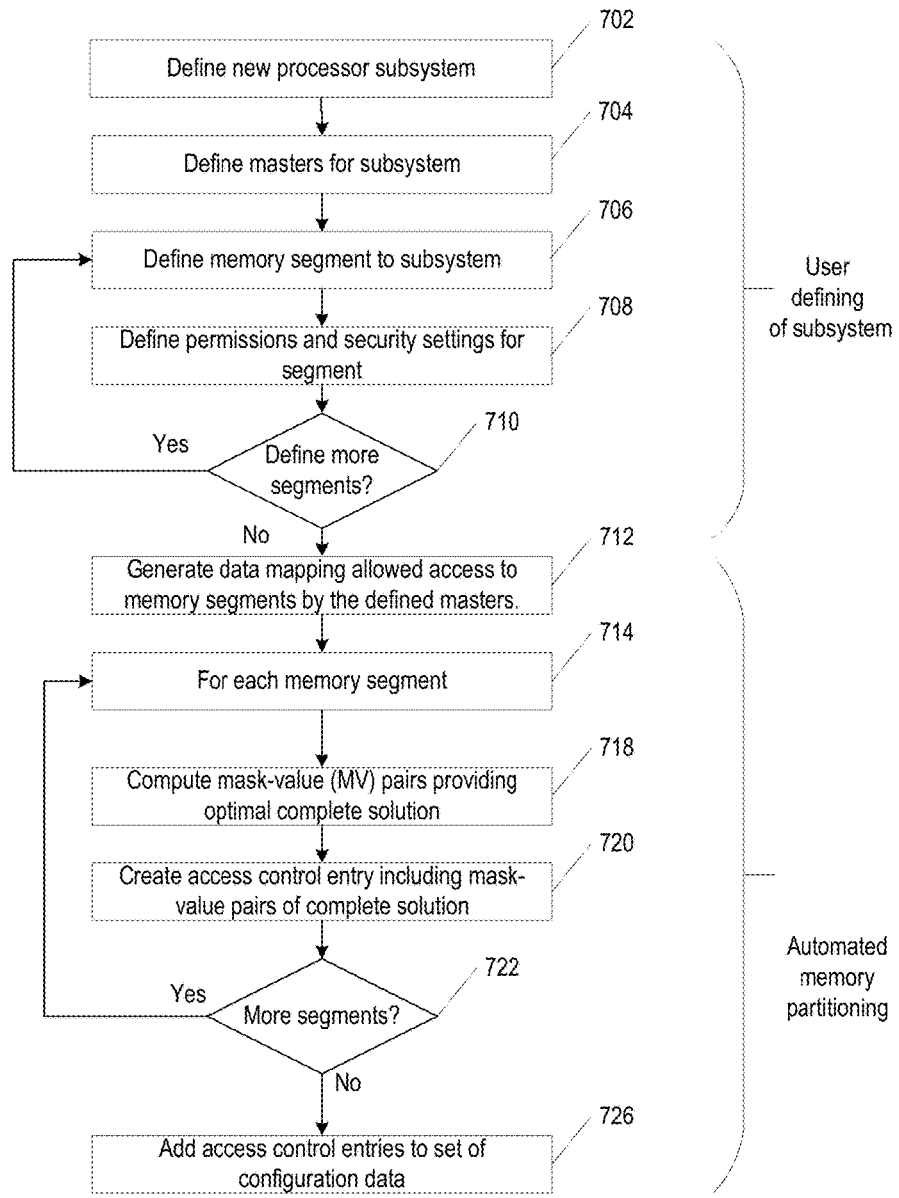
FIG. 7 shows a process for automatically generating configuration data configured to cause a memory management circuit in the programmable IC to enforce access to user-defined memory segments by user-defined master circuits according to user specified permissions.

FIG. 7 shows a process for automatically generating configuration data that may be used to configure a memory management circuit in the programmable IC to enforce access to user-defined memory segments by user-defined master circuits according to user specified permissions. At block 702, a new subsystem is created in response to user input via a GUI. At block 704, master circuits are defined for the subsystem in response to user input via the GUI. At block 706, a memory segment is defined for the subsystem in response to user input via the GUI. At block 708, access permissions and/or security settings are defined for the segment in response to user input via the GUI. If more segments are to be defined, decision block 710 directs the process back to block 706. When a user is done defining memory segments, decision block 710 directs the process to block 712. At block 712, data is created to indicate a mapping of permitted access to memory segments by master circuits.

Mask-value pairs providing an optimal complete solution are computed for each segment in a process loop beginning with block 714 and ending with decision block 722. For each memory segment, mask-value pairs providing an optimal complete solution are determined at block 718. At block 720, an access control entry is created for each mask-value pair in the complete solution that indicates the determined mask-value pairs for the optimum complete solution. After the process loop has been performed for each memory segment, decision block 722 directs the process to add the generated access control entries to a set of configuration data at block 726.

Figure 8:
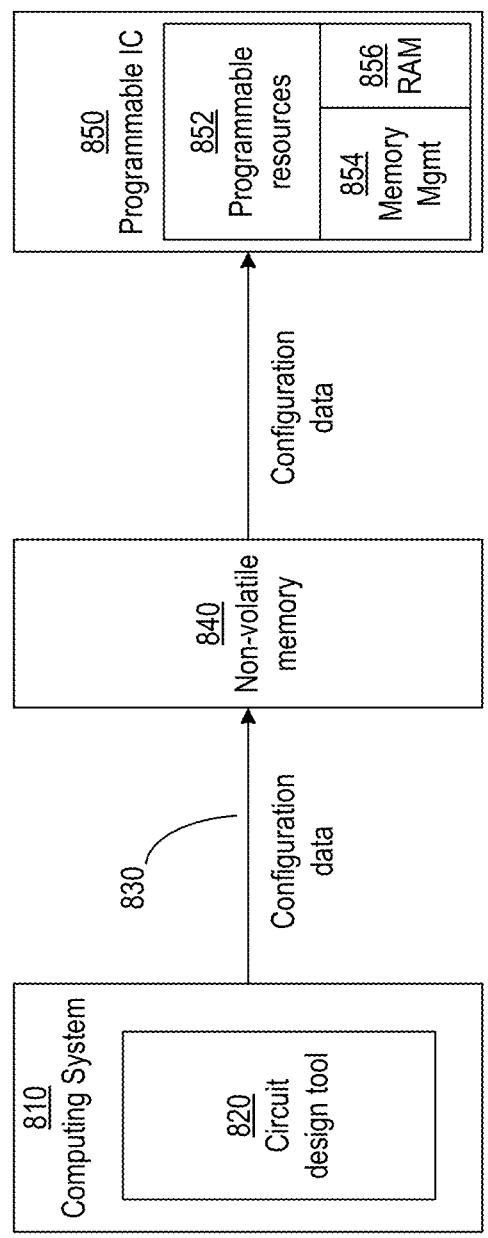
FIG. 8 shows an example system having a software-based circuit design tool configured to partition memory of a programmable IC for subsystems of a circuit design, consistent with one or more implementations.

FIG. 8 shows an example system having a computing system configured to execute a circuit design tool for partitioning memory of a programmable IC for subsystems of a circuit design, consistent with one or more implementations. Software executed on computing system 810 provides a circuit design tool 820 for creation of circuit designs to be implemented on a programmable IC 850. As described with reference to FIG. 6, the circuit design tool 820 provides a graphical user interface (GUI) having interface elements for a user to define subsystems of a circuit design, master circuits in the subsystems, memory segments in a memory 856 of a programmable IC, and access permissions for the memory segments.

The circuit design tool 820 generates a set of configuration data 830 in response to the user defining subsystems, master circuits, memory segments, and permissions. The configuration data includes a first portion configured to cause a memory management circuit 854 in the programmable IC 850 to restrict access to the memory segments in the memory 856 according to the defined access permissions.

The configuration data 830 also includes a second portion configured to cause programmable resources 852 to implement circuitry specified in the circuit design. The generated set of configuration data 830 is stored in a non-volatile memory 840 coupled to the programmable IC 850. When the programmable IC is powered on, the configuration data 830 is retrieved from the non-volatile memory 840 and used to configure the programmable resources 852 and memory management circuit 854 as previously described.

Figure 9:
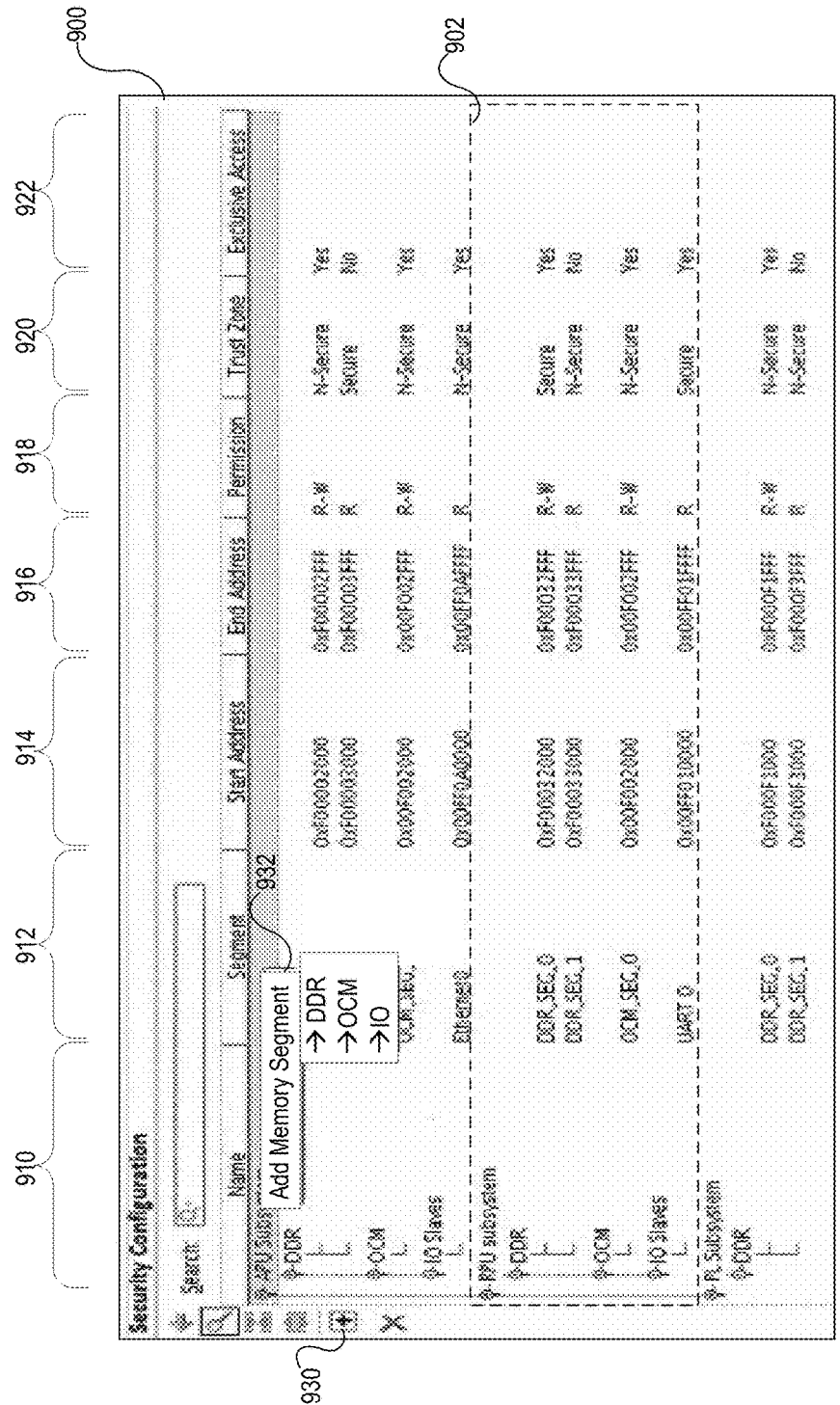
FIG. 9 shows an example graphical user interface (GUI), consistent with one or more implementations.

FIG. 9 shows an example GUI 900 for user configuration of subsystems, master circuits, memory segments, and access permissions, consistent with one or more implementations. In this example, the GUI includes a window configured to display a hierarchical arrangement of subsystems defined for the circuit design, and memory segments defined for each subsystem. Dashed block 902 shows a hierarchical arrangement of memory segments for one subsystem. In this example, the hierarchical arrangement shown in block 902 includes memory segments defined for a double data rate (DDR) memory, an on-chip memory (OCM), and a memory used to buffer data communicated to or from input/output slave devices (IO Slaves).

In this example, names of defined subsystems and available memories in a programmable IC are displayed in column 910. Names of defined memory segments are displayed in column 912. Start and ending addresses for each memory segment are displayed in columns 914 and 916. Read and write permissions for access to the memory segment by circuits of the subsystem are shown in column 918. In this example, the defined memory segments may be categorized as either secure or non-secure. In some implementations, access to secure memory segments may be limited to circuits that are designated as being secure. A graphical indication of whether or not memory segments are secure is displayed in column 920. A graphical indication of whether or not the subsystem has exclusive access to the memory segment is also displayed in column 922.

The GUI may utilize various mechanisms to define and configure subsystems master circuits, and/or memory segments. As one example, the GUI may include a button 930 to add a new subsystem. When the button 930 is pressed, the GUI may present a pop up interface for a user to specify information for the subsystem such as name and/or a portion of a circuit design included in the subsystem. As another example, the GUI may provide pop-up selection 932 to add a new memory segment to a subsystem in response to a user right-clicking on a subsystem. In this example, the pop-up selection 932 allows a user to select one of the available memories to define a new segment. After a new segment is added, a user may define or adjust the name, address range, permissions, or trust and access indicators by double clicking on a textbox in one of the columns 912, 914, 916, 918, 920, and 922 of the segment.

Figure 10:
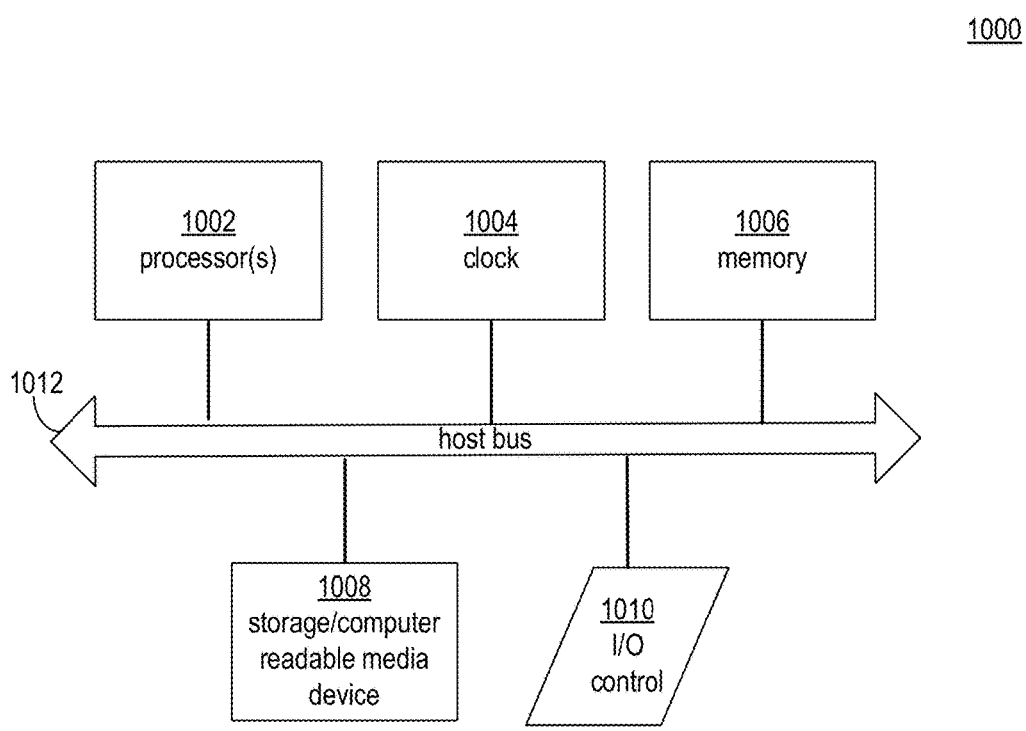
FIG. 10 shows an example computing system for implementing the disclosed processes.

FIG. 10 shows a block diagram of an example computing arrangement that may be configured to implement the data structures and processes described herein. It will be appreciated that various alternative computing arrangements, including one or more processors and a memory arrangement configured with program code, would be suitable for hosting the disclosed processes and data structures. The computer code, which implements the disclosed processes, is encoded in a processor executable format and may be stored and provided via a variety of computer-readable storage media or delivery channels such as magnetic or optical disks or tapes, electronic storage devices, or as application services over a network.

Processor computing arrangement 1000 includes one or more processors 1002, a clock signal generator 1004, a memory arrangement 1006, a storage arrangement 1008, and an input/output control unit 1010, all coupled to a host bus 1012. The arrangement 1000 may be implemented with separate components on a circuit board or may be implemented internally within an integrated circuit. When implemented internally within an integrated circuit, the processor computing arrangement is otherwise known as a microcontroller.

The architecture of the computing arrangement depends on implementation requirements as would be recognized by those skilled in the art. The processor(s) 1002 may be one or more general purpose processors, or a combination of one or more general purpose processors and suitable co-processors, or one or more specialized processors (e.g., RISC, CISC, pipelined, etc.).

The memory arrangement 1006 typically includes multiple levels of cache memory, and a main memory. The storage arrangement 1008 may include local and/or remote persistent storage, such as provided by magnetic disks (not shown), flash, EPROM, or other non-volatile data storage. The storage unit may be read or read/write capable. Further, the memory arrangement 1006 and storage arrangement 1008 may be combined in a single arrangement.

The processor(s) 1002 executes the software in storage arrangement 1008 and/or memory arrangement 1006, reads data from and stores data to the storage arrangement 1008 and/or memory arrangement 1006, and communicates with external devices through the input/output control arrangement 1010. These functions are synchronized by the clock signal generator 1004. The resource of the computing arrangement may be managed by either an operating system (not shown), or a hardware control unit (not shown).

Figure 11:
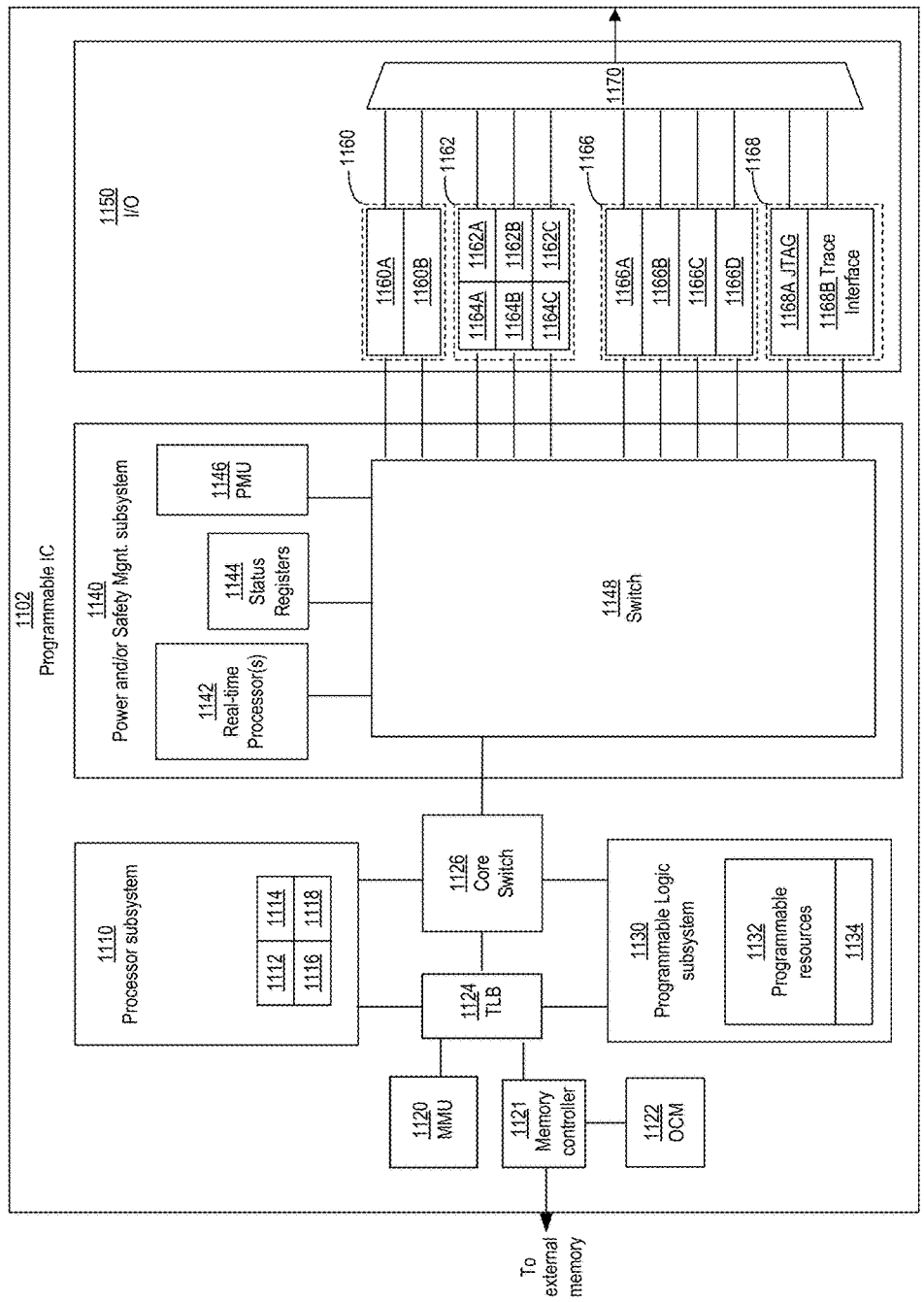
FIG. 11 shows an example programmable IC having a memory management circuit that may be configured to restrict access to user-defined memory segments by user-defined master circuits according to user-defined permissions.

FIG. 11 shows a programmable IC 1102 that may be configured in accordance with one or more implementations. The programmable IC may also be referred to as a System On Chip (SOC), which includes a processor subsystem 1110 and a programmable logic subsystem 1130. The processor subsystem 1110 may be programmed to implement a software portion of the user design, via execution of a user program. The program may be specified as part of a configuration data stream or may be retrieved from an on-chip or off-chip data storage device. The processor subsystem 1110 may include various circuits 1112, 1114, 1116, and 1118 for executing one or more software programs. The circuits 1112, 1114, 1116, and 1118 may include, for example, one or more processor cores, floating point units (FPUs), an interrupt processing unit, on chip-memory, memory caches, and/or cache coherent interconnect.

The programmable logic subsystem 1130 of the programmable IC 1102 may be programmed to implement a hardware portion of a user design. For instance, the programmable logic subsystem may include a number of programmable resources 1132, which may be programmed to implement a set of circuits specified in a configuration data stream. The programmable resources 1132 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 1132 may be programmed by loading a configuration data stream into the configuration memory cells, which define how the programmable interconnect circuits and programmable logic circuits are configured. The collective states of the individual memory cells then determine the function of the programmable resources 1132. The configuration data can be read from memory (e.g., from an external PROM) or written into the programmable IC 1102 by an external device. In some implementations, configuration data may be loaded into configuration memory cells by a configuration controller 1134 included in the programmable logic subsystem 1130. In some other implementations, the configuration data may be loaded into the configuration memory cells by a start-up process executed by the processor subsystem 1110.

The programmable IC 1102 may include various circuits to interconnect the processor subsystem 1110 with circuitry implemented within the programmable logic subsystem 1130. In this example, the programmable IC 1102 includes a core switch 1126 that can route data signals between various data ports of the processor subsystem 1110 and the programmable logic subsystem 1130. The core switch 1126 may also route data signals between either of the programmable logic or processing subsystems 1110 and 1130 and various other circuits of the programmable IC, such as an internal data bus. Alternatively or additionally, the processor subsystem 1110 may include an interface to directly connect with the programmable logic subsystem—bypassing the core switch 1126. Such an interface may be implemented, for example, using the AMBA AXI Protocol Specification (AXI) as published by ARM.

In some implementations, the processor subsystem 1110 and the programmable logic subsystem 1130 may also read or write to memory locations of an on-chip memory 1122 or off-chip memory (not shown) via memory controller 1121. The memory controller 1121 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 1121 is able to communicate is provided for purposes of illustration only and is not intended as a limitation or to be exhaustive. As shown in FIG. 11, the programmable IC 1102 may include a memory management unit 1120 and translation look-aside buffer 1124 to translate virtual memory addresses used by the subsystems 1110 and 1130 to physical memory addresses used by the memory controller 1121 to access specific memory locations.

The programmable IC may include an input/output (I/O) subsystem 1150 for communication of data with external circuits. The I/O subsystem 1150 may include various types of I/O devices or interfaces including for example, flash memory type I/O devices, higher performance I/O devices, lower performance interfaces, debugging I/O devices, and/or RAM I/O devices.

The I/O subsystem 1150 may include one or more flash memory interfaces 1160 illustrated as 1160A and 1160B. For example, one or more of flash memory interfaces 1160 can be implemented as a Quad-Serial Peripheral Interface (QSPI) configured for 4-bit communication. One or more of flash memory interfaces 1160 can be implemented as a parallel 8-bit NOR/SRAM type of interface. One or more of flash memory interfaces 1160 can be implemented as a NAND interface configured for 8-bit and/or 16-bit communication. It should be appreciated that the particular interfaces described are provided for purposes of illustration and not limitation. Other interfaces having different bit widths can be used.

The I/O subsystem 1150 can include one or more interfaces 1162 providing a higher level of performance than flash memory interfaces 1160. Each of interfaces 1162A-1162C can be coupled to a DMA controller 1164A-1164C respectively. For example, one or more of interfaces 1162 can be implemented as a Universal Serial Bus (USB) type of interface. One or more of interfaces 1162 can be implemented as a gigabit Ethernet type of interface. One or more of interfaces 1162 can be implemented as a Secure Digital (SD) type of interface.

The I/O subsystem 1150 may also include one or more interfaces 1166 such as interfaces 1166A-1166D that provide a lower level of performance than interfaces 1162. For example, one or more of interfaces 1166 can be implemented as a General Purpose I/O (GPIO) type of interface. One or more of interfaces 1166 can be implemented as a Universal Asynchronous Receiver/Transmitter (UART) type of interface. One or more of interfaces 1166 can be implemented in the form of a Serial Peripheral Interface (SPI) bus type of interface. One or more of interfaces 1166 can be implemented in the form of a Controller-Area-Network (CAN) type of interface and/or an I²C type of interface. One or more of interfaces 1166 also can be implemented in the form of a timer type of interface.

The I/O subsystem 1150 can include one or more debug interfaces 1168 such as processor JTAG (PJTAG) interface 1168A and a trace interface 11688. PJTAG interface 1168A can provide an external debug interface for the programmable IC 1102. Trace interface 11688 can provide a port to receive debug, e.g., trace, information from the processor subsystem 1110 or the programmable logic subsystem 1130.

As shown, each of interfaces 1160, 1162, 1166, and 1168 can be coupled to a multiplexer 1170. Multiplexer 1170 provides a plurality of outputs that can be directly routed or coupled to external pins of the programmable IC 1102, e.g., balls of the package within which the programmable IC 1102 is disposed. For example, I/O pins of programmable IC 1102 can be shared among interfaces 1160, 1162, 1166, and 1168. A user can configure multiplexer 1170, via a configuration data stream to select which of interfaces 1160-1168 are to be used and, therefore, coupled to I/O pins of programmable IC 1102 via multiplexer 1170. The I/O subsystem 1150, may also include a fabric multiplexer I/O (FMIO) interface (not shown) to connect interfaces 1162-1168 to programmable logic circuits of the programmable logic subsystem. Additionally or alternatively, the programmable logic subsystem 1130 can be configured to implement one or more I/O circuits within programmable logic. In some implementations, the programmable IC 1102 may also include a subsystem 1140 having various circuits for power and/or safety management. For example, the subsystem 1140 may include a power management unit 1146 configured to monitor and maintain one or more voltage domains used to power the various subsystems of the programmable IC 1102. In some implementations, the power management unit 1146 may disable power of individual subsystems, when idle, to reduce power consumption, without disabling power to subsystems in use.

The subsystem 1140 may also include safety circuits to monitor the status of the subsystems to ensure correct operation. For instance, the subsystem 1140 may include one or more real-time processors 1142 configured to monitor the status of the various subsystems (e.g., as indicated in status registers 1144). The real-time processors 1142 may be configured to perform a number of tasks in response to detecting errors. For example, for some errors, the real-time processors 1142 may generate an alert in response to detecting an error. As another example, the real-time processors 1142 may reset a subsystem to attempt to restore the subsystem to correct operation. The subsystem 1140 includes a switch network 1148 that may be used to interconnect various subsystems. For example, the switch network 1148 may be configured to connect the various subsystems 1110, 1130, and 1140 to various interfaces of the I/O subsystem 1150. In some applications, the switch network 1148 may also be used to isolate the real-time processors 1142 from the subsystems that are to be monitored. Such isolation may be required by certain application standards (e.g., IEC-61508 SIL3 or ISO-26262 standards) to ensure that the real-time processors 1142 are not affected by errors that occur in other subsystems.

Those skilled in the art will appreciate that various alternative computing arrangements, including one or more processors and a memory arrangement configured with program code, would be suitable for hosting the processes and data structures disclosed herein. In addition, the processes may be provided via a variety of computer-readable storage media or delivery channels such as magnetic or optical disks or tapes, electronic storage devices, or as application services over a network.

The methods and circuits are thought to be applicable to a variety of systems and applications. Other aspects and features will be apparent to those skilled in the art from consideration of the specification. For example, though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:
1. A computer-implemented method for protecting a memory segment from unauthorized access, comprising:
  executing on a processor the operations of:
    determining a first set of mask-value pairs based on a set of allowed identifiers (IDs) indicating circuits of a circuit design to be allowed access to the memory segment and a set of non-allowed IDs indicating circuits of the circuit design to be denied access to the memory segment, wherein the mask-value pairs of the first set respectively match at least one ID of the set of allowed IDs and match none of the IDs of the set of non-allowed IDs;
    removing one or more redundant mask-value pairs from the first set of mask-value pairs to produce a second set of mask-value pairs;
    determining one or more subsets of mask-value pairs in the second set of mask-value pairs, wherein in each subset of mask-value pairs, each allowed ID in the set of allowed IDs matches at least one mask-value pair in the subset;

determining respective levels of processing efficiency for the determined subsets of mask-value pairs based on a number of mask-value pairs included in the subset;

selecting a subset of mask-value pairs having a highest level of processing efficiency;

generating and storing a set of configuration data configured to cause a memory management circuit, included in a programmable integrated circuit (IC) having a memory including the memory segment, to enforce access to the memory segment based on the selected subset of mask-value pairs;

configuring a set of programmable resources of the programmable IC with the configuration data to implement circuitry specified by the circuit design; and restricting access, using the memory management circuit in the programmable IC, to the memory segment to master circuits in the circuit design having respective IDs matching one or more of the mask-value pairs in the selected subset of mask-value pairs.

2. The method of claim 1, wherein the removing of one or more redundant mask-value pairs from the first set of mask-value pairs includes, for a first mask-value pair in the first set, removing the first mask-value pair from the first set in response to each ID in the set of allowed IDs that matches the first mask-value pair also matching a second mask-value pair in the first set.

3. The method of claim 1, wherein the removing of one or more redundant mask-value pairs from the first set of mask-value pairs includes generating a respective solution array for each mask-value pair in the first set, wherein the solution array includes, for each ID in the set of allowed IDs, a respective bit, and wherein the respective bit is set to a first value if the mask-value pair matches the ID and is set to a second value if the mask-value pair does not match the ID.

4. The method of claim 3, wherein the removing of one or more redundant mask-value pairs from the first set of mask-value pairs further includes for a first mask-value pair in the first set, determining whether or not the first mask-value pair is a subset of a second mask-value pair by performing a bitwise AND operation of the respective solution array for the first mask-value pair and the respective solution array for the second mask-value pair.

5. The method of claim 4, wherein the removing of one or more redundant mask-value pairs from the first set of mask-value pairs further includes removing the first mask-value pair from the first set of mask-value pairs in response to a result of the bitwise AND operation being equal to the respective solution array for the first mask-value pair.

6. The method of claim 1, wherein the determining one or more subsets of mask-value pairs includes:

for each of the second set of mask-value pairs:
creating a respective empty subset of mask-value pairs; and
adding the mask-value pair to the respective subset of mask-value pairs; and for each of the respective subsets of mask-value pairs, while one or more allowed IDs of the set of allowed IDs are not matched by any mask-value pair in the respective subset of mask-value pairs:
selecting a mask-value pair of the second set of mask-value pairs that matches a largest number of the one or more allowed IDs that are not matched by any mask-value pair in the respective subset of mask-value pairs; and
adding the selected mask-value pair to the subset of mask value pairs.

7. The method of claim 1, wherein the set of configuration data includes:

a first portion configured to, when input to the programmable IC, cause the memory management circuit in the programmable IC to enforce access to a memory address range corresponding to the memory segment based on the selected subset of mask-value pairs; and a second portion configured to, when input to the programmable IC, cause programmable resources of the programmable IC to implement the circuits of the circuit design.

8. The method of claim 7, further comprising storing the set of configuration data in a non-volatile memory coupled to the programmable IC, wherein the programmable IC is configured to retrieve the set of configuration data from the non-volatile memory when powered on.

9. The method of claim 8, further comprising in response to the programmable IC being powered on:

retrieving the set of configuration data from the non-volatile memory; and configuring the set of programmable resources of the programmable IC, using the second portion of configuration data to implement the circuitry specified by the circuit design.

10. The method of claim 1, further comprising executing program code that implements a user interface on the processor, the user interface including interface elements for a user to define subsystems for the circuit design, master circuits for each subsystem, a set of memory segments for each subsystem, and permissions for accessing each of the set of memory segments by the master circuits, wherein each master circuit has a respective ID.

11. The method of claim 10, further comprising, using the user interface, displaying a hierarchical arrangement of subsystems defined for the circuit design, master circuits defined for each subsystem, and memory segments defined for each subsystem.

12. The method of claim 11, further comprising, for each memory segment in the hierarchical arrangement, displaying via the user interface a defined address range of the memory segment and permissions for accessing the memory segment by defined master circuits of the subsystem including the memory segment in the hierarchical arrangement.

13. The method of claim 12, wherein the displaying of the permissions using the user interface includes displaying a graphical indication of whether or not access to the memory segment is exclusive to the subsystem.

14. A system, comprising:
a processor; and
a programmable integrated circuit (IC) having a memory coupled to the processor, the memory configured with a set of instructions that when executed by the processor, causes the processor to:
determine a first set of mask-value pairs based on a set of allowed identifiers (IDs) indicating circuits of a circuit design to be allowed access to a memory segment included in the memory and a set of non-allowed IDs indicating circuits of the circuit design to be denied access to the memory segment, wherein the mask-value pairs of the first set respectively match at least one ID of the set of allowed IDs and match none of the IDs of the set of non-allowed IDs;

remove one or more redundant mask-value pairs from the first set of mask-value pairs to produce a second set of mask-value pairs;

determine one or more subsets of mask-value pairs in the second set of mask-value pairs, wherein in each subset of mask-value pairs, each allowed ID in the set of allowed IDs matches at least one mask-value pair in the subset;

determine respective levels of processing efficiency for the determined subsets of mask-value pairs based on a number of mask-value pairs included in the subset;

select the subset of mask-value pairs having a highest level of processing efficiency;

generate and store a set of configuration data in the memory of the system, wherein the configuration data is configured to cause a memory management circuit, included in the programmable IC, to enforce access to the memory segment based on the selected subset of mask-value pairs;

configure a set of programmable resources of the programmable IC with the configuration data to implement circuitry specified by the circuit design; and restrict access, using the memory management circuit in the programmable IC, to the memory segment to master circuits in the circuit design having respective IDs matching one or more of the mask-value pairs in the selected subset of mask-value pairs.

15. The system of claim 14, wherein the instructions cause the processor to generate a respective solution array for each mask-value pair in the first set, wherein the solution array includes, for each ID in the set of allowed IDs, a respective bit, and wherein the respective bit is set to a first value if the mask-value pair matches the ID and is set to a second value if the mask-value pair does not match the ID.

16. The system of claim 15, wherein the instructions cause the processor to identify the one or more redundant mask-value pairs by, for each mask-value pair in the first set:
  selecting the mask-value pair;
  determining whether or not the selected mask-value pair is a subset of another mask-value pair in the first set by, for each other mask-value pair in the first set, performing a bitwise AND operation of the respective solution array for the selected mask-value pair and the respective solution array for the other mask-value pair; and
  identifying the selected mask-value pair as redundant, in response to a result of the bitwise AND operation being equal to the respective solution array for the selected mask-value pair.

17. The system of claim 16, wherein the instructions cause the processor to determine the one or more subsets of mask-value pairs by:
  for each of the second set of mask-value pairs:
    creating a respective empty subset of mask-value pairs; and
    adding the mask-value pair to the respective subset of mask-value pairs; and
  for each of the respective subsets of mask-value pairs, while one or more allowed IDs of the set of allowed IDs are not matched by any mask-value pair in the respective subset of mask-value pairs:
    selecting a mask-value pair of the second set of mask-value pairs that matches a largest number of the one or more allowed IDs that are not matched by any mask-value pair in the respective subset of mask-value pairs; and
    adding the selected mask-value pair to the subset of mask value pairs.

18. The system of claim 14, further comprising, a non-volatile memory coupled to the processor;
  wherein the memory management circuit is coupled to the non-volatile memory; and
  wherein the instructions further cause the processor to store the set of configuration data in the non-volatile memory; and
  wherein the programmable IC is configured to retrieve the set of configuration data from the non-volatile memory in response to being powered on.

19. The system of claim 18, wherein the memory management circuit on the programmable IC includes:
  a respective first circuit configured to output a first signal indicating whether or not a destination address indicated in a transaction request is within an address range of the respective memory segment; and
  a respective second circuit configured to determine if any mask-value pair in the selected subset of mask-value pairs matches the ID indicated in the transaction request.

20. The system of claim 14, wherein the set of instructions are configured to cause the processor to provide a user interface including interface elements for a user to define subsystems for the circuit design, master circuits for each subsystem, a set of memory segments for each subsystem, and permissions for accessing each of the set of memory segments by the master circuits, wherein each master circuit has a respective ID.

* * * * *